United States Patent [19]
Saeijs et al.

[11] Patent Number: 6,008,959
[45] Date of Patent: Dec. 28, 1999

[54] RECORDING/REPRODUCING APPARATUS FOR STORING A DIGITAL INFORMATION SIGNAL IN A STORAGE MEDIUM USING PACKET A METHOD AND A RECORD CARRIER, WHICH FURTHER ALLOWS FOR EDITING THE STORED DIGITAL INFORMATION SIGNAL BY INCLUDING REFERENCES TO ADDITIONAL PACKETS

[75] Inventors: Ronald W. J. J. Saeijs, Eindhoven, Netherlands; Jurgen H. T. Geerlings, Tadley Hampshire, United Kingdom

[73] Assignee: U.S. Philips Corporation, New York, N.Y.

[21] Appl. No.: 08/674,520

[22] Filed: Jul. 2, 1996

[30] Foreign Application Priority Data

Jul. 5, 1995 [EP] European Pat. Off. ............... 95201831

[51] Int. Cl.$^6$ ....................................................... G11B 5/09
[52] U.S. Cl. .............................................................. 360/48
[58] Field of Search .................................. 360/48, 32, 40; 370/394, 522; 386/2, 54, 105, 106; 348/385; 369/47, 48, 49, 54, 58, 59, 60

[56] References Cited

U.S. PATENT DOCUMENTS

| | | | |
|---|---|---|---|
| 4,575,772 | 3/1986 | Shimada et al. | 386/97 |
| 4,583,132 | 4/1986 | Nakano et al. | 386/97 |
| 5,475,499 | 12/1995 | Taguchi | 386/105 |
| 5,537,157 | 7/1996 | Washino et al. | 348/722 |
| 5,579,183 | 11/1996 | Van Gestel et al. | 360/48 |
| 5,596,581 | 1/1997 | Saeijs et al. | 370/394 |
| 5,745,638 | 4/1998 | Rijckaert et al. | 386/54 |

*Primary Examiner*—W. Chris Kim
*Attorney, Agent, or Firm*—Edward W. Goodman

[57] ABSTRACT

A first digital information signal, such as a digital video signal, is recorded in MPEG encoded form in the form of first packets in first track portions ($TP_1$) on a record carrier. Program information contained packets ($P_0'$) are also recorded in the first track portions. In a subsequent editing step, an additional information signal, such as an audio signal, is MPEG encoded into second packets and recorded in second track portions ($TP_2$) of the tracks. In order to enable a reproduction of the video signal and the additional audio signal in a later reproduction step, the program information contained packets ($P_0'$) recorded in the first track portions are such that the program information indicates that the first packets and at least the second packets belong together.

51 Claims, 4 Drawing Sheets

|   | TP$_1$ | TP$_2$ |
|---|---|---|
| I | P$_1$, picp (A= s$_1$+s$_2$, t(s$_1$), t(s$_2$)) | P$_2$ |
| II | P$_1$, picp (A= s$_1$, B=s$_2$, t(s$_1$),t(s$_2$)) | P$_2$ |
| III | P$_1$, picp (A= s$_1$, B=s$_1$+s$_2$ t(s$_1$),t(s$_2$)) | P$_2$ |
| IV | P$_1$,P$_2$, picp (A= s$_1$+s$_2$+s$_3$,t(s$_1$) t(s$_2$),t(s$_3$)) | P$_3$ |
| V | P$_1$,P$_2$, picp (A= s$_1$+s$_2$, B=s$_1$+s$_3$, t(s$_1$),t(s$_2$),t(s$_3$)) | P$_3$ |
| VI | P$_1$,P$_2$, picp (A= s$_1$+s$_2$, B=s$_1$+s$_2$+s$_3$ t(s$_1$),t(s$_2$),t(s$_3$)) | P$_3$ |

FIG. 8

|   | TP$_1$ | TP$_2$ |
|---|---|---|
| I | P$_1$, picp$_1$(A= s$_1$+s$_2$,t(s$_1$)) | P$_2$, picp$_2$(t(s$_2$)) |
| II | P$_1$, picp$_1$(A=s$_1$, B=s$_2$, t(s$_1$)) | P$_2$, picp$_2$(t(s$_2$)) |
| III | P$_1$, picp$_1$(A=s$_1$, B=s$_1$+s$_2$ t(s$_1$)) | P$_2$, picp$_2$(t(s$_2$)) |
| IV | P$_1$, P$_2$, picp$_1$(A=s$_1$+s$_2$+s$_3$, t(s$_1$), t(s$_2$)) | P$_3$, picp$_2$(t(s$_3$)) |
| V | P$_1$,P$_2$ picp$_1$(A=s$_1$+s$_2$, B=s$_1$+s$_3$, t(s$_1$),t(s$_2$)) | P$_3$, picp$_2$(t(s$_3$)) |
| VI | P$_1$,P$_2$, picp$_1$(A=s$_1$+s$_2$, B=s$_1$+s$_2$+s$_3$ t(s$_1$),t(s$_2$)) | P$_3$, picp$_2$(t(s$_3$)) |

FIG. 9

RECORDING/REPRODUCING APPARATUS FOR STORING A DIGITAL INFORMATION SIGNAL IN A STORAGE MEDIUM USING PACKET A METHOD AND A RECORD CARRIER, WHICH FURTHER ALLOWS FOR EDITING THE STORED DIGITAL INFORMATION SIGNAL BY INCLUDING REFERENCES TO ADDITIONAL PACKETS

BACKGROUND OF THE INVENTION

1. Field of the Invention

The invention relates to an apparatus for storing in a first recording step, a first digital information signal in a first storage region of a storage medium.

The invention also relates to a method for carrying out a recording and a subsequent edit step, and to a record carrier obtained with the apparatus or the method. More specifically, the invention relates to an apparatus of the helical scan type, for recording in a recording step, a digital video signal and a corresponding digital audio signal in first track portions on a record carrier.

2. Description of the Related Art

An apparatus for recording and/or reproducing a digital video signal is known from EP-A 492,704, corresponding to U.S. Pat. No. 5,245,483, document D1 in the list of related documents that can be found at the end of this description. The digital video signal is data compressed and subsequently channel encoded so as to obtain a signal that is suitable for recording in the first track portions in the tracks. The data compression technique carried out on the digital video signal may result in the digital video signal to be encoded into an MPEG encoded digital information signal.

The MPEG encoded information signal comprises transport packets that may occur irregularly in the serial datastream of the MPEG transport stream received. The ISO/IEC 13.818 international standard, part 1 'Systems', dated Nov. 13, 1994, document D2 in the list of related documents, comprises a description of a transport system for transmitting an MPEG information signal, which may include a data compressed digital video signal and a corresponding data compressed digital audio signal, for broadcasting purposes or for transmission via a cable network. The MPEG information signal is in the form of transport packets comprises 188 bytes of information each.

Packets in the MPEG serial data stream comprise, apart from 'system information', one kind of information, that is: either a portion of a video signal, or a portion of an audio signal, or a portion of a data signal. A plurality of video signals and/or a plurality of audio signals and/or a plurality of data signals may be transmitted via the transport packets in the MPEG serial data stream. A packet also comprises information of only one of the video signals, or one of the audio signals or one of the data signals transmitted via the MPEG serial data stream. Further packets are present in the serial datastream which comprise information about which of packets belong to one and the same video or audio signal, and information indicating which of the video and audio signals belong together and form a so-called 'program'.

A transmission of such MPEG information signal, in the form of a recording on and a reproduction from a record carrier, requires special measures to be taken in order to realize such kind of transmission.

Earlier filed applications U.S. Ser. No. 08/225,193, having a filing date of Aug. 4, 1994, now U.S. Pat. No. 5,579,183 (PHN 14.818), document (D3) in the list of related documents, and U.S. Ser. No. 08/253,535, having a filing date of Mar. 6, 1994, now U.S. Pat. No. 5,596,581 (PHA 21.886), document (D4) in the list of related documents, describe various of such measures to realize a recording and reproduction of an MPEG information signal.

It can generally be said that the recording of a complete MPEG information signal is not well possible, because of the too high data rate of the MPEG information signal.

One of the video signals and its corresponding audio signal(s) included in the MPEG serial datastream are now selected for recording. As a consequence, generally, transport packets will be selected on an irregular basis as a function of time. In order to preserve the timing relation between the subsequent packets selected, after having recorded and reproduced the packets, the earlier filed documents describe the measure to insert timing information (or a 'time stamp') in each of the packets recorded. Upon reproduction, the timing relation between the subsequent packets can be regained using the time stamps. The packets thus obtained are recorded in the first track portions after having been subjected to a channel encoding step.

SUMMARY OF THE INVENTION

The invention aims at providing an apparatus which is capable of carrying out an edit mode so that an additional information signal, such as an additional audio signal, can be added to the digital information signal recorded in the first storage region of the storage medium, that is, in the situation of a longitudinal record carrier: eg., the first track portions of the tracks.

The apparatus as defined in the opening paragraph is characterized in that (a) during said recording step, the first encoding means is adapted to generate such program information comprising packets, that the program information comprised in such packets indicates that the first packets and at least second packets belong together, that (b) the apparatus is further adapted to record, in a subsequent edit mode a second digital information signal in a second storage region of the storage medium, the input means further being adapted to receive the second digital information signal, the first encoding means further being adapted to encode said second digital information signal so as to obtain a second serial datastream comprising the second packets, the second packets comprising portions of information of the second digital information signal, the second encoding means being further adapted to channel encode the second serial datastream so as to obtain a second channel signal, the writing means further being adapted to write the second channel signal into the second storage region of the storage medium, and that (c) in said reproduction step the apparatus is further adapted to reproduce said first digital information signal and/or said second digital information signal from said first storage region and said second storage region, respectively, using said read means. More specifically, the apparatus of the helical scan type is characterized in that (a) during said recording step, the first encoding means is adapted to generate such program information comprising packets, that the program information comprised in such packets indicates that the first packets and the second packets and at least third packets belong together, that (b) the apparatus is further adapted to record in a subsequent edit mode, a second digital audio signal in second track portions of the tracks, the input means further being adapted to receive the second digital audio signal, the first encoding means further being adapted to encode said second digital audio signal so as to obtain a second serial datastream of third packets, the third packets comprising portions of information of the second digital audio signal, the second encoding means being further adapted to channel encode the second serial datastream so as to obtain a second channel signal, the writing means further being adapted to write the second channel signal into the second track portions of the tracks, and that (c) in said reproduction step, the apparatus is further adapted to reproduce said digital video signal and said first digital audio signal from said first track portions, and to reproduce said digital video signal and said second digital audio signal from said first and second track portions, respectively, using said read means.

The invention is based on the following recognition. In a normal recording mode, where a video signal and a corresponding audio signal are recorded on a record carrier, the encoding of the audio signal and the video signal is such that first packets are generated comprising portions of information of the video signal and second packets are generated comprising portions of information of the corresponding audio signal. Further, packets are generated comprising the already introduced program information. This program information indicates that the serial datastream comprises first packets corresponding to one video signal and second packets corresponding to one audio signal, and that the video signal comprised in the first packets and the audio signal comprised in the second packets belong together. Those program information comprising packets are also included in the serial datastream and subsequently recorded in the first track portions of the tracks.

Reproduction of the video signal and the corresponding audio signal using the program information is now possible.

Second track portions are available in the tracks so as to enable a later editing step. In this editing step, at least one additional audio signal can be supplied to the apparatus and encoded in the encoder so that (third) packets are generated comprising portions of information of the at least second audio signal. After channel encoding, these third packets are recorded in the second track portions, while leaving the information in the first track portions unaltered.

Reproduction of the information from both the first and second track portions results in a serial datastream in which all the first, the second, the at least third packets, and the program information comprising packets are included. The decoder receives this serial datastream and recognizes, from the program information comprised in the program information comprising packets that first and second packets are included in the serial datastream that comprise a video signal and an audio signal, respectively, and that this video and audio signal belong to each other (form one program). The decoder will thus not recognize the third packets. Consequently, it is not possible to decode the third packets, and thus not possible to display the video signal on a TV screen together with a reproduction of the additional audio signal.

In accordance with the invention, in the initial recording step, in which the video signal and the original audio signal are recorded in the first track portions, such program information comprising packets are generated that the program information comprised in such packets indicates that the first packets and the second packets and at least third packets belong together. The program information comprising packets thus generated are recorded in the first track portions together with the first and the second packets. Upon reproduction, the information recorded in the first track portions is read out. The second track portions may comprise no information at all. The program information comprising packets are retrieved from the serial data stream and the decoder now recognizes that the information comprised in first, second and third packets belong together. The decoder decodes the first and second packets comprised in the serial datastream. No third packets are present in the serial data stream. The decoder is however capable of decoding the first and second packets, and supplying the digital video signal and the original digital audio signal to outputs of the apparatus.

In the edit mode of operation, the additional audio signal is recorded in the form of the third packets in the second track portions of the tracks. If a subsequent reproduction is carried out, the serial datastream of information read from the tracks now comprises first, second and third packets. From the program information comprised in the program information comprising packets that are retrieved from the serial data stream, the decoder again recognizes that the information comprised in first, second and third packets belong together. The decoder may now be capable of decoding all three kinds of packets so as to regenerate the digital video signal and the original and the additional digital audio signals. Upon receipt of a selection signal, one of the two digital audio signals can be selected and supplied to the output together with the digital video signal.

In another embodiment, in response to a selection signal supplied to the decoder, the decoder decodes the first packets and one of the second or third packets, so that the digital video signal and one of the original and additional digital audio signals are supplied to outputs of the apparatus. In this situation, the apparatus is thus capable of reproducing the digital video signal together with the original audio signal, and to reproduce the digital video signal together with the additional digital audio signal, recorded later in the edit mode of operation.

As already explained above, the apparatus may refrain from recording any information in the second track portions during the original recording step. In the later edit step, the second track portions will then be filled with the third packets. Alternatively, the encoder in the apparatus can generate third packets during the original recording step, in spite of the fact that no additional digital audio signal is supplied to the apparatus. This means that the third packets now recorded in the second track portions comprise no audio information, or said audio information corresponds to an audio signal having a zero amplitude.

In an alternative embodiment of the invention, the apparatus of the helical scan type, for recording, in a recording step, a digital video signal and a corresponding digital audio signal in first track portions on a record carrier, the digital video signal and the digital audio signal being included in a serial datastream of information packets, the serial datastream comprising first packets comprising portions of information of the digital video signal and second packets comprising portions of information of the digital audio signal, and comprising program information comprising packets, the program information comprised in said program comprising packets indicating that the first packets and the second packets belong together, the apparatus comprising input means for receiving the serial datastream of information packets, channel encoding means for channel encoding the serial datastream of information packets so as to obtain a first channel signal, writing means, comprising at least one write head, for writing the first channel signal into the first track portions of the tracks, the apparatus further being adapted to reproduce in a reproducing step, said digital video signal and said corresponding digital audio signal from said first track portions, the apparatus further comprising reading means, comprising at least one read head, for reading the first channel signal from the first track portions of the tracks, channel decoding means for channel decoding the first channel signal so as to obtain a replica of the serial datastream of information packets, first decoding means for decoding the first packets so as to obtain a replica of the digital video signal, and for decoding the second packets so as to obtain a replica of the digital audio signal, using said program information comprising packets, output means for supplying the replicas of the digital video signal and the digital audio signal, is characterized in that the apparatus is provided with conversion means for converting the program information comprised packets into converted packets, that (a) during said recording step, the conversion means are adapted to convert the program information comprising packets to such converted packets, that the program information comprised in such converted packets indicates that the first packets and the second packets and at least third packets belong together, that (b) the apparatus is further adapted to record, in a subsequent edit mode, a second digital audio signal in second track portions of the tracks, the input means further being adapted to receive the second digital audio signal, encoding means being present for encoding said second digital audio signal so as to obtain a second serial datastream of third packets, the third packets comprising portions of information of the second digital audio signal, the channel encoding means being further adapted to channel encode the second serial datastream so as to obtain a second channel signal, the writing means further being adapted to write the second channel signal into the second track portions of the tracks, and that (c) in said reproduction step, the apparatus is further adapted to reproduce said digital video signal and said first digital audio signal from said first track portions, and to reproduce said digital video signal and said second digital audio signal from said first and second track portions respectively, using said read means.

The recording apparatus can receive, during the original recording step, a broadcast signal which includes the digital video signal and the original digital audio signal which are already MPEG encoded. That is, it receives the serial datastream of the first and second packets, this serial datastream also including program information comprised packets. The program information contained in this program information comprised packets indicates that the serial datastream comprises first packets corresponding to the one video signal and second packets corresponding to the one audio signal, and that the video signal comprised in the first packets and the audio signal comprised in the second packets belong together. Prior to channel encoding the serial datastream, these program information comprised packets are converted into converted packets. The program information contained in this converted program information comprised packets indicates that the serial datastream comprises first packets corresponding to the one video signal, second packets corresponding to the one audio signal and third packets corresponding to an additional audio signal, and that the video signal comprised in the first packets, the audio signal comprised in the second packets and the additional audio signal comprised in the third packets belong together. The converted packets are inserted in the serial datastream instead of the original program information comprised packets and the converted serial datastream is subsequently channel encoded and recorded in the first track portions of the tracks.

The invention thus far described, went out from an apparatus of the helical scan type, for recording the information in slant tracks on the record carrier. It should however be noted that the invention is equally well applicable in apparatuses for recording the information in tracks that run in the length direction on the longitudinal record carrier. In such a situation, one or more first tracks are available for recording the first digital information signal (the digital video signal), and one or more second tracks are available for recording the second information signal (the additional audio signal). Moreover, the invention is also applicable for storing the information in a storage medium, such as a hard disk, or another type of random access memory.

In another embodiment of the invention, the apparatus for storing, in a first recording step, a first digital information signal in a first storage region of a storage medium, the apparatus comprising input means for receiving the first digital information signal, first encoding means for encoding the first digital information signal so as to obtain a serial datastream of information packets, the serial datastream comprising first packets comprising portions of information of the first digital information signal, the first encoding means further being adapted to generate first program information comprising packets, said first program information comprising packets also being included in the serial datastream, second encoding means for channel encoding the serial datastream of information packets so as to obtain a first channel signal, storing means for storing the first channel signal into the first storage region of the storage medium, the apparatus further being adapted to reproduce in a first reproducing step, said first digital information signal from said first storage region, the apparatus further comprising retrieval means for retrieving the first channel signal from the first storage region, channel decoding means for channel decoding the first channel signal so as to obtain a replica of the serial datastream of information packets, is characterized in that (a) during said recording step, the first encoding means is adapted to generate such first program information comprising packets, that the program information comprised in such packets indicates that there may be second packets comprising portions of information of a second digital information signal of a not yet known type, that (b) the apparatus is further adapted to record, in a subsequent edit mode, a second digital information signal in a second storage region of the storage medium, the second digital information signal being included in a second serial datastream comprising second packets and second program information comprising packets, the second packets comprising portions of information of the second digital information signal and the second program information comprising packets comprise information indicating the type of the second digital information signal, the second encoding means being further adapted to channel encode the second serial datastream so as to obtain a second channel signal, the writing means further being adapted to write the second channel signal into the second storage region of the storage medium, and that (c) in said reproduction step, the apparatus is further adapted to reproduce said first digital information signal and/or said second digital information signal from said first storage region and said second storage region respectively, using said read means. In this situation, the program information comprised in the first program information comprising packets indicates that there may be an additional (second) information signal, but that the type of signal (video, audio, data or otherwise) is not yet known. This requires the generation of second program information comprised packets, which are inserted in the second serial datastream. The program information comprised in the second program information comprising packets now indicates the type of the second information signal, and may indicate whether the second information signal form a program with the first digital information signal.

In an equivalent way, the apparatus for storing, in a first recording step, a first digital information signal in a first storage region of a storage medium, the first digital information signal being included in a serial datastream of information packets, the serial datastream comprising first packets comprising portions of information of the first digital information signal, and comprising program information comprising packets, the program information comprised in said program comprising packets indicating that the serial datastream comprises first packets of the first digital information signal, the apparatus comprising input means for receiving the serial datastream of packets, channel encoding means for channel encoding the serial datastream of packets so as to obtain a first channel signal, storing means for storing the first channel signal into the first storage region of the storage medium, the apparatus further being adapted to reproduce, in a reproducing step, said first digital information signal from said first storage region, the apparatus further comprising retrieval means for retrieving the first channel signal from the first storage region, channel decoding means for channel decoding the first channel signal so as to obtain a replica of the serial datastream of packets, is characterized in that the apparatus is provided with conversion means for converting the program information comprised packets into converted packets, that (a) during said recording step, the conversion means are adapted to convert the program information comprising packets to such converted packets, that the program information comprised in such converted packets indicates that there may be second packets comprising portions of information of a second digital information signal of a not yet known type, that (b) the apparatus is further adapted to record, in a subsequent edit mode, a second digital information signal in a second storage region of the storage medium, the second digital information signal being included in a second serial datastream comprising second packets and second program information comprising packets, the second packets comprising portions of information of the second digital information signal and the second program information comprising packets comprise information indicating the type of the second digital information signal, the channel encoding means being further adapted to channel encode the second serial datastream so as to obtain a second channel signal, the writing means further being adapted to write the second channel signal into the second storage region of the storage medium, and that (c) in said reproduction step, the apparatus is further adapted to reproduce said first digital information signal and/or said second digital information signal from said first storage region and said second storage region respectively, using said read means.

BRIEF DESCRIPTION OF THE DRAWINGS

These and other aspects of the invention will be apparent from and further elucidated with reference to embodiments described in the following figure description, in which:

FIG. 8 shows various situations of combinations of signals that can be received and recorded; and FIG. 9 another embodiment of the invention, for enabling the editing of an additional information signal of a not yet known type.

DESCRIPTION OF THE PREFERRED EMBODIMENTS

Figure 1:
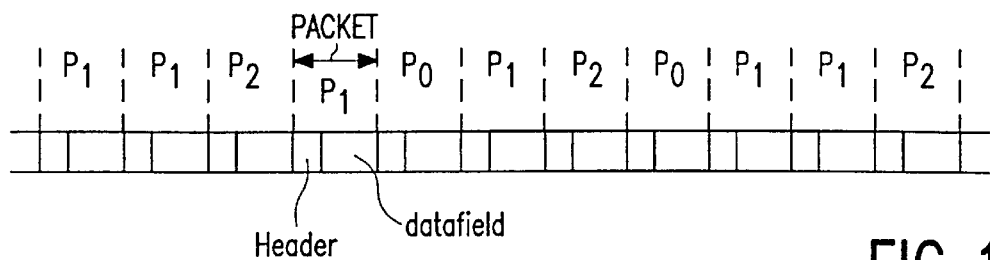
FIG. 1 shows schematically, the serial datastream of an MPEG encoded information signal.

FIG. 1 shows schematically the serial datastream of an MPEG encoded digital video signal and a corresponding digital audio signal. The serial datastream comprises packets of information. The packets comprise 188 bytes of information each. Each packet comprises a header and a datafield. A packet comprises information of one kind of signal. In the headers of the packets, a packet identifier number (PID) is included, identifying the kind of information included in a packet. Packets having the same PID comprise the same information stream. The serial datastream comprises first packets $P_1$ which have bytes of information of a digital video signal stored in them and comprises second packets $P_2$ which have bytes of information of an audio signal stored in them. Further, packets $P_0$ are included in the serial datastream. The packets $P_0$ contain program information. The program information included in the packets $P_0$ identify a first information stream comprising the first packets $P_1$, as being a video information stream, a second information stream comprising the second packets $P_2$ as being an audio information stream. Further, the program information indicates that the first and second information streams belong together and form a so-called 'program'.

The packets in FIG. 1 are shown as having equal durations in time. This is not necessarily so. Further, the packets are shown as forming an uninterrupted serial datastream. This is also not necessarily the fact. The packets may occur irregularly as a function of time in the serial datastream.

Figure 2:
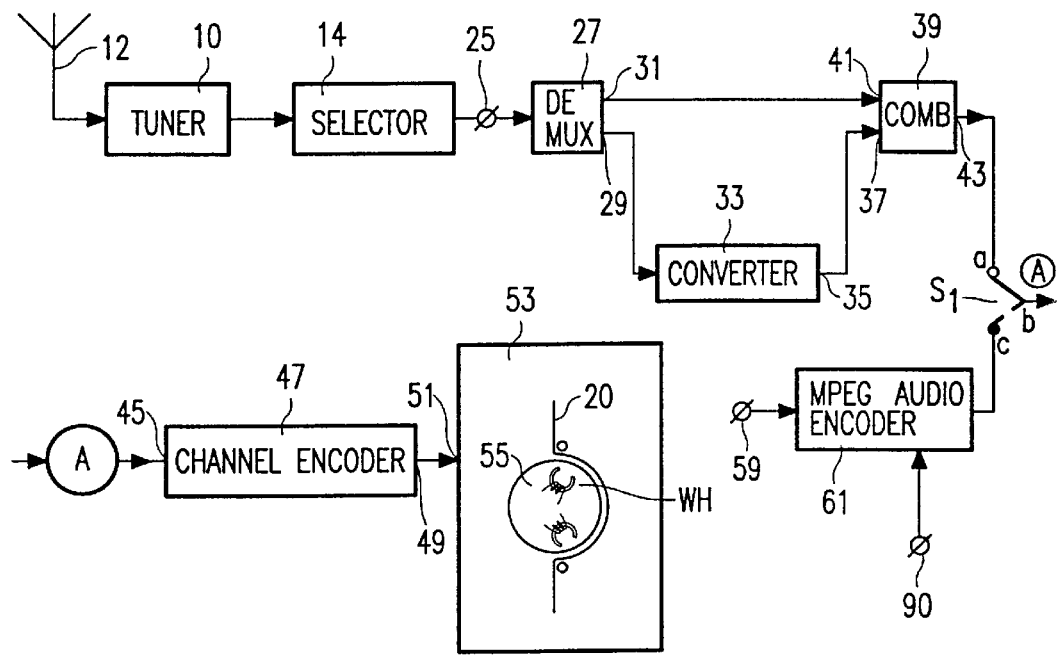
FIG. 2 shows a first embodiment of the apparatus in accordance with the invention.
Figure 3:
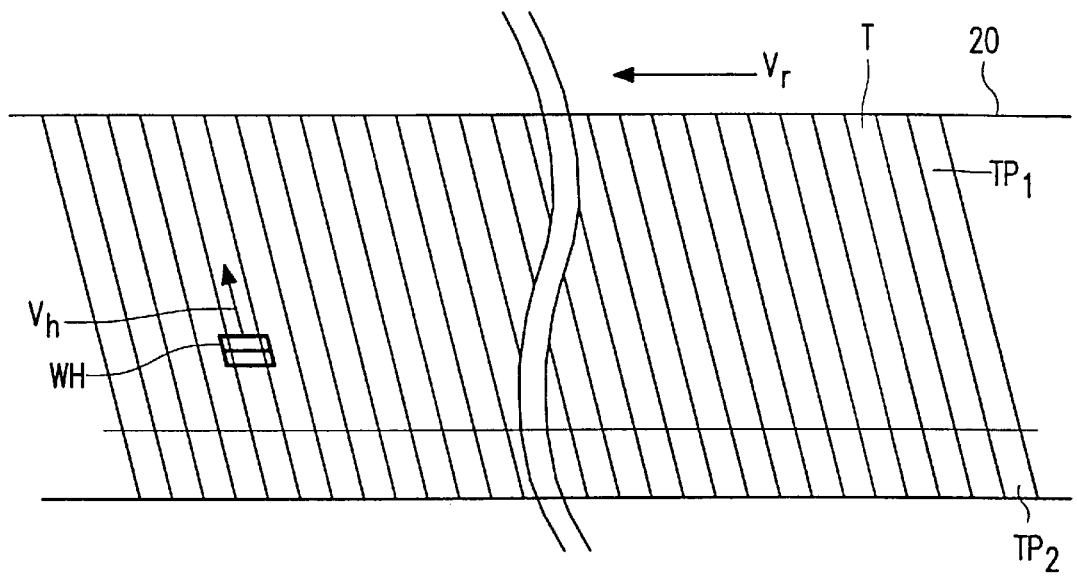
FIG. 3 shows the record carrier obtained with the apparatus.

It is assumed that the serial datastream given in FIG. 1 is recorded on a record carrier by means of a recording apparatus in a first recording step. FIG. 2 shows, schematically, an embodiment of such a recording apparatus, and FIG. 3 shows, schematically, the slant tracks T recorded on the record carrier 20. The record carrier 20 is seen from the magnetic side, that is: it shows the side of the record carrier that contacts the head drum. The slope of the tracks compared to the longitudinal direction of the record carrier 20 is exaggerated so as to simplify the explanation. Tracks comprise first track portions TP1 and second track portions TP2. The serial datastream shown in FIG. 1 will be recorded in the first track portions. The arrow $v_r$ denotes the direction of travel of the record carrier 20. A writing head WH is present for writing channel encoded information in the tracks T. The arrow $V_h$ denotes the direction of travel of the writing head WH. The second track portions TP2 are present for recording an additional audio signal in a later edit step.

The apparatus has an input terminal for receiving the serial datastream shown in FIG. 1. The serial datastream may have been obtained from a tuner 10 that receives an MPEG encoded broadcast signal via an antenna 12. A selector 14 selects the packets comprising the digital video signal and the digital audio signal, generates the packets $P_0$, and supplies the serial datastream shown in FIG. 1 to the input terminal 25. The apparatus comprise a demultiplexer 27 which retrieves the packets $P_0$ from the serial datastream of FIG. 1 and supplies the packets $P_0$ to an output 29. The datastream of the packets $P_1$ and $P_2$ are supplied to an output 31. The output 29 is coupled to a converter unit 33, which has an output 35 coupled to an input 37 of a signal combination unit 39. The output 31 of the de multiplexer 27 is coupled to an input 41 of the combination unit 39. An output 43 of the combination unit 39 is coupled to an a-terminal of a switch $S_1$. A b-terminal of the switch $S_1$ is coupled to an input 45 of a channel encoding unit 47, an output 49 of which is coupled to an input 51 of a writing unit 53. In the present embodiment, the writing unit 53 comprise at least one write head WH positioned on a rotating head drum 55 (preferably two writing heads are available, located at 180° around the circumference of the head drum). The record carrier 20 is wrapped around the head drum 55 over a certain wrapping angle around the drum. The wrapping angle is in numerous occasions slightly larger than 180°.

The recording apparatus of FIG. 2 functions as follows in the original recording step. The switch $S_1$ is or is set into its position a-b. The serial datastream of FIG. 1 is supplied to the demultiplexer 27, and the packets $P_1$ and $P_2$ are supplied via the output 31 to the input 41 of the combination unit 39. The packets $P_0$ are supplied via the output 29 to the converter unit 33. The converter unit 33 converts the packets $P_0$ into converted packets $P_0'$ and supplied via its output 35 to the input 37 of the combination unit 39. The combination unit 39 inserts the converted packets $P_0'$ instead of the packets $P_0$ in the serial datastream. This serial datastream is channel encoded in a manner well known in the art into a first channel signal, and the first channel signal is recorded in the first track portions TP1 of the record carrier 20.

The converter unit 33 converts the packets $P_0$ such that the program information contained in the converted program information comprised packets $P_0'$ indicates that the serial datastream supplied at the output 43 comprises first packets corresponding to the one video signal, second packets corresponding to the one audio signal and third packets (although not present yet) corresponding to an additional audio signal, and that the video signal comprised in the first packets, the audio signal comprised in the second packets and the additional audio signal comprised in the third packets belong together. The serial datastream supplied at the output 43 in fact does not comprise any third packets, but that does not matter.

It will be clear that, as the serial datastream of packets $P_0'$, $P_1$ and $P_2$ is recorded in the first track portions TP1 only, some time compression of the first channel signal may be required so as to realize that no recording takes place when the write head scans the second track portions TP2.

The apparatus of FIG. 2 further comprises an input terminal 59 for receiving an additional audio signal that can be recorded, during a subsequent edit step, in the second track portions TP2 on the record carrier 20. The input terminal 59 is coupled to an input of an MPEG audio encoder 61, which has an output coupled to the c-terminal of the switch $S_1$.

Figure 4:
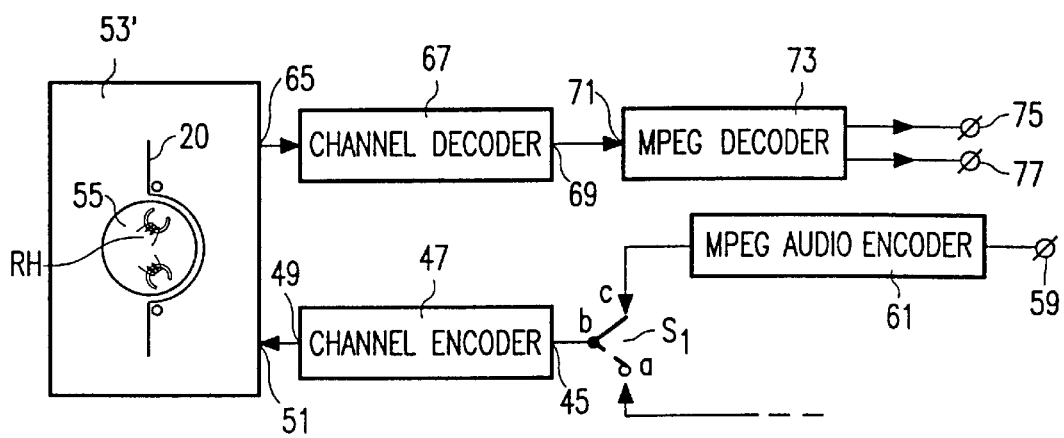
FIG. 4 shows additional elements comprised in the apparatus of FIG. 2, for carrying out an edit step.

In a subsequent edit step, the apparatus of FIG. 2 functions as described with reference to FIG. 4. FIG. 4 shows, in addition to the elements shown in FIG. 2, those elements that are required for enabling a reproduction of the information recorded on the record carrier 20. The writing unit 53 also functions as a reading unit 53' for reading information from the tracks on the record carrier 20. The unit 53' comprises a reading head RH mounted on the drum 55. Signals read from the tracks are supplied via an output 65 to a channel decoding unit 67. An output 69 of the channel decoder 67 is coupled to an input 71 of an MPEG decoding unit 73. The MPEG decoder 73 supplies a video signal to an output terminal 75 and at least one audio signal to an output terminal 77.

In the edit step, the read head RH, which may be the same as the write head WH, reads the first channel signal, that is recorded in the first track portions of the tracks. The first channel signal is supplied to the channel decoder 67 and channel decoded therein so as to obtain a replica of the serial datastream of the first and the second packets $P_1$ and $P_2$, and the converted packets $P_0$ '. This serial datastream is supplied to the decoder 73. Under the influence of the program information contained in the converted packets $P_0'$, the decoder 73 is capable of decoding the first and second packets into replicas of the digital video signal and the digital audio signal. Those signals are then supplied to the terminals 75 and 77, respectively. The digital video signal may be supplied to a TV screen so that the video signal is visible for a person.

An additional audio signal is supplied to the input terminal 59 and encoded in the MPEG audio encoder 61. Because of the presence of a control signal applied to the terminal 90, the MPEG audio encoder 61 is aware of the fact that an edit mode of operation is switched on so that only third packets $P_3$ need to be generated. This results in the generation of a sequence of third packets $P_3$. Next, a channel encoding step, again well known in the art, is carried out on the MPEG encoded additional digital audio signal so as to obtain a second channel signal, that is subsequently stored in the second track portions TP2 of the tracks by means of the write head WH.

In a subsequent normal reproduction mode, the read head RH reads the information recorded in the first and second track portions of the tracks. That is: the first channel signal from the first track portions and the second channel signal from the second track portions. A channel decoding step is carried out on the first and second channel signals in the decoder 67. This results in a serial datastream as shown in FIG. 5.

Figure 5:
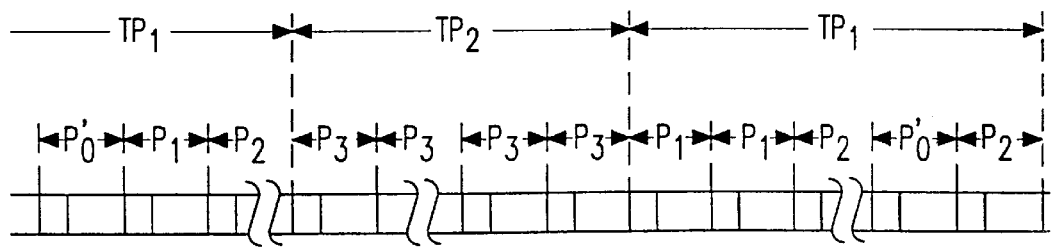
FIG. 5 shows the reproduced serial datastream of packets including the third packets read from the second track portions.

FIG. 5 shows blocks of packets read from the first track portions $TP_1$ and blocks of packets read from the second track portions $TP_2$. The blocks of packets read from the first track portions comprise the first and second packets $P_1$ and $P_2$ respectively, and the packets $P_0'$. The blocks of packets read from the second track portions comprise the third packets $P_3$. An MPEG decoding step is carried out on the serial datastream of FIG. 5 in the decoder 73. At the output terminal 75, the digital video signal is available. At the output terminal 77, either the original audio signal or the additional audio signal, or both may be available.

Figure 6:
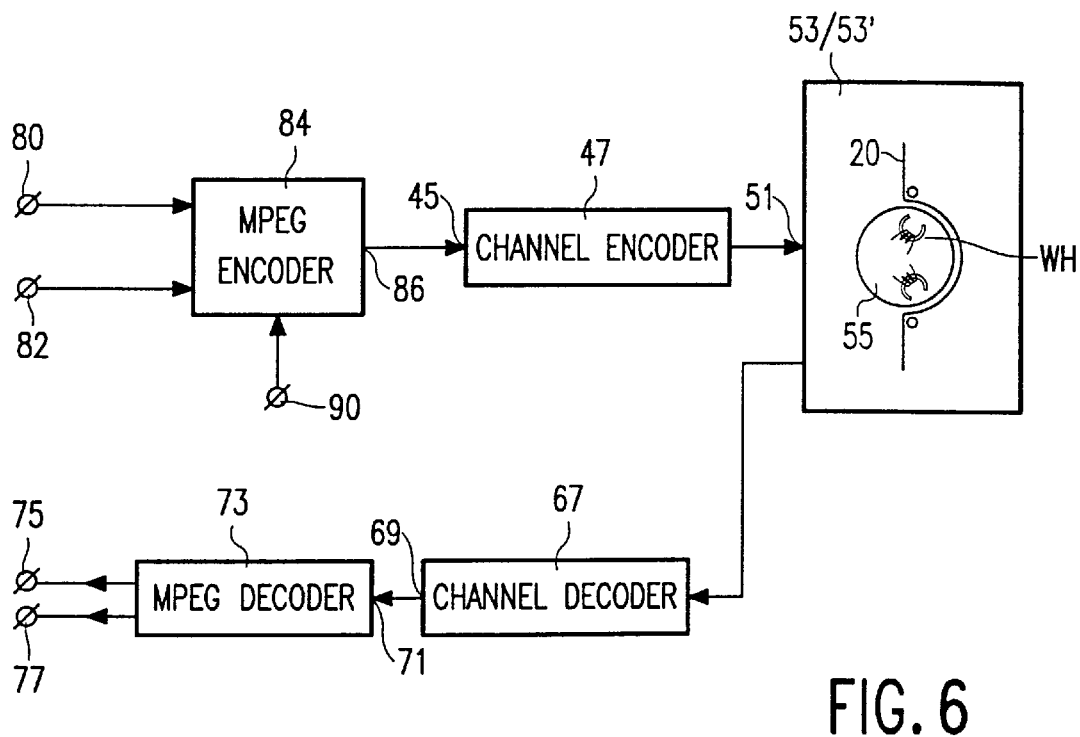
FIG. 6 shows another embodiment of the apparatus.

FIG. 6 shows another embodiment of the apparatus in accordance with the invention. The apparatus has an input terminal 80 for receiving a digital video signal and an input terminal 82, for receiving a digital audio signal. Both signals are supplied to an MPEG encoder 84. Both signals are MPEG encoded in the encoder 84 so as to obtain a serial datastream of packets $P_0'$, $P_1$ and $P_2$. It will thus be understood that, although one digital video signal and one digital audio signal (and thus no additional audio signal) are supplied to the terminals 80 and 82, packets $P_0'$ are generated by the encoder 84, such that the program information contained in the packets $P_0'$ indicates that the serial datastream supplied at the output 86 comprises first packets corresponding to the one video signal, second packets corresponding to the one audio signal, and third packets (although not present yet) corresponding to an additional audio signal, and that the video signal comprised in the first packets, the audio signal comprised in the second packets, and the additional audio signal comprised in the third packets belong together. Channel encoding in the encoder 47 takes place in the way already described above with reference to FIG. 2.

In a subsequent edit mode, the apparatus of FIG. 6 in fact functions in the way as described above with reference to FIG. 4. An additional audio signal is supplied to the terminal 82 and MPEG encoded in the MPEG encoder 84. Because of the presence of a control signal applied to the terminal 90, the MPEG encoder is aware of the fact that an edit mode of operation is switched on so that only third packets $P_3$ need to be generated. The packets are channel encoded and recorded in the second track portions $TP_2$, as already described above.

In the foregoing, it has been assumed that during the original recording step, no third packets are formed, as no additional audio signal is available at that moment. It may however be possible to generate those third packets and arrange them in the serial sequence as shown in FIG. 5, prior to recording in the apparatus of FIG. 2 or 6. The third packets now may comprise an audio signal of zero amplitude.

Figure 7:
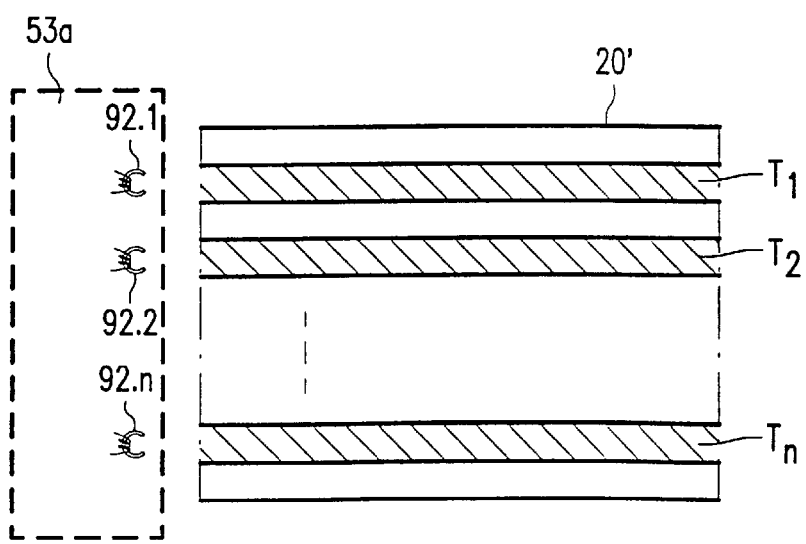
FIG. 7 shows the storage of the information in track running in the longitudinal direction on the record carrier.

In the foregoing, the invention has been described with reference to an apparatus of the helical scan type. It will be clear that the invention is also applicable during recording of the information in tracks that run in the longitudinal direction on the record carrier. FIG. 7 shows a part of a longitudinal record carrier 20' having tracks of information recorded on it, and running in the longitudinal direction of the record carrier 20'. An apparatus, such as disclosed in the FIGS. 2, 4 and 6, is provided with a read/write unit 53$a$ comprising heads 92.1 to 92.n. The heads 92.1 to 92.n are adapted to write information in the record carrier 20' so as to obtain the tracks $T_1$ to $T_n$. The first serial datastream comprising the encoded digital video signal, the encoded first digital audio signal and the program information comprising packets, is recorded in the tracks $T_1$ to $T_p$ and the serial datastream comprising the encoded second digital audio signal is recorded in the tracks $T_{p+1}$ to $T_n$, where p<n, and n is an integer larger than one.

In a further embodiment, the information may be stored in a storage medium, such as a hard disk or another kind of random access memory. In this situation, the storage medium has a first storage region in which the first serial datastream, comprising the encoded digital video signal, the encoded first digital audio signal and the program information comprising packets, is stored, and a second storage region in which the second serial datastream, comprising the encoded second digital audio signal, is stored.

FIG. 8 shows schematically, the various signals that can be recorded in the first and second track portions (or: first and second storage regions) $TP_1$ and $TP_2$, respectively. We assume a situation where the edit step has been carried out already. In situation I, the first track portions comprises first packets $P_1$ of a first digital information signal $s_1$, such as a digital video signal, and the program information comprised packets 'picp'. The second track portion comprises second packets $P_2$ comprising information of a second digital information signal $s_2$, such as a digital audio signal. The program information contained in the program information comprised packets 'picp' indicates that the first digital information signal $s_1$ is an information signal of a certain type $t(s_1)$, such as a digital video signal, that the second digital information signal $s_2$ is an information signal of a certain type $t(s_2)$, such as a digital audio signal, and that a program A is present comprising both the digital information signals $s_1$ and $s_2$. Upon reproduction, the decoder knows from the picp packets that two information signals may be present. The user may select one or both of the signals for reproduction.

In situation II, the first track portions comprise first packets $P_1$ of the first digital information signal $s_1$ and the program information comprised packets 'picp'. The second track portion comprises the second packets $P_2$ comprising information of the second digital information signal $s_2$. The program information contained in the program information comprised packets 'picp' indicates that the first digital information signal $s_1$ is an information signal of a certain type $t(s_1)$, such as a digital video signal, that the second digital information signal $s_2$ is an information signal of a certain type $t(s_2)$, such as a digital audio signal, and that a program A is present comprising the first digital information signal $s_1$, and that a program B is present comprising the second digital information signal $s_2$. Upon reproduction, the decoder knows from the picp packets that two information signals may be present. The user may select one of the programs, and thus one of the two signals, for reproduction.

In situation III, the first track portions comprise first packets $P_1$ of the first digital information signal $s_1$ and the program information comprised packets 'picp'. The second track portion comprises the second packets $P_2$ comprising information of the second digital information signal $S_2$. The program information contained in the program information comprised packets 'picp' indicates that the first digital information signal $s_1$, is an information signal of a certain type $t(s_1)$, such as a digital video signal, that the second digital information signal $s_2$ is an information signal of a certain type $t(s_2)$, such as a digital audio signal, that a program A is present comprising the first digital information signal $s_1$ and that a program B is present comprising the first and the second digital information signal $s_2$ Otherwise said: in program B, the first and second digital information signal belong together. Upon reproduction, the decoder knows from the picp packets that two information signals may be present. The user may select one of the programs. Upon the selection of program A, the signal $s_1$ is reproduced only. Upon the selection of program B, both signals will be reproduced.

In situation IV, the first track portions comprise first packets $P_1$ of the first digital information signal $s_1$, second packets $P_2$ of a second digital information signal $S_2$, such as a digital audio signal, and the program information comprised packets 'picp'. The second track portions comprise third packets $P_3$ comprising information of a third digital information signal $S_3$, such as an additional audio signal. The program information contained in the program information comprised packets 'picp' indicates that the first digital information signal $s_1$, is an information signal of a certain type $t(s_1)$, such as a digital video signal, that the second digital information signal $s_2$ is an information signal of a certain type $t(s_2)$, such as a digital audio signal, that the third digital information signal $s_3$ is an information signal of a certain type $t(s_3)$, that a program A is present comprising the first, second and third digital information signals and that the three digital information signal belong together. Upon reproduction, the decoder knows from the picp packets that three information signals may be present. The user may select one or more of the three signals. More specifically, the user may select the reproduction of the signals $s_1$, and $s_2$ at the same time, or the reproduction of the signals $s_1$, and $s_3$ at the same time.

In situation V, the first track portions comprise the first packets $P_1$ of the first digital information signal $s_1$, the second packets $P_2$ of a second digital information signal $S_2$, such as a digital audio signal, and the program information comprised packets 'picp'. The second track portions comprise the third packets $P_3$ comprising information of a third digital information signal $s_3$, such as an additional audio signal. The program information contained in the program information comprised packets 'picp' indicates that the first digital information signal $s_1$ is an information signal of a certain type $t(s_1)$, such as a digital video signal, that the second digital information signal $s_2$ is an information signal of a certain type $t(s_2)$, such as a digital audio signal, that the third digital information signal $S_3$ is an information signal of a certain type $t(s_3)$, that a program A is present comprising the first and the second digital information signals and that the two digital information signal belong together, and that a program B is present comprising the first and the third digital information signals and that the two digital information signals belong together. Upon reproduction, the decoder knows from the picp packets that three information signals may be present combined into two programs. The user may select one of the two programs for reproduction.

In situation VI, the first track portions comprise the first packets $P_1$ of the first digital information signal $s_1$, the second packets $P_2$ of a second digital information signal $s_2$, such as a digital audio signal, and the program information comprised packets 'picp'. The second track portions comprise the third packets $P_3$ comprising information of a third digital information signal $s_3$, such as an additional audio signal. The program information comprised in the program information comprised packets 'picp' indicates that the first digital information signal $s_1$ is an information signal of a certain type $t(s_1)$, such as a digital video signal, that the second digital information signal $s_2$ is an information signal of a certain type $t(s_2)$, such as a digital audio signal, that the third digital information signal $s_3$ is an information signal of a certain type $t(s_3)$, that a program A is present comprising the first and the second digital information signals and that the two digital information signal belong together, and that a program B is present comprising the three digital information signals and that the three digital information signals belong together. Upon reproduction, the decoder knows from the picp packets that three information signals may be present combined into two programs. The user may select one of the two programs for reproduction.

FIG. 9 shows another embodiment of the invention. We again assume a situation where the edit step has been carried out already, the same situations as discussed above with reference to FIG. 8 will be discussed. In situation I, the first track portions comprises first packets $P_1$ of a first digital information signal $s_1$, such as a digital video signal, and the first program information comprised packets '$picp_1$'. The second track portion comprises second packets $P_2$ comprising information of a second digital information signal $s_2$, such as a digital audio signal, and second program information comprised packets '$picp_2$'. The program information contained in the first program information comprised packets '$picp_1$' indicates that the first digital information signal $s_1$ is an information signal of a certain type $t(s_1)$, such as a digital video signal, that a second digital information signal $s_2$ of a not yet known type may be present, and that a program A is present comprising both the digital information signals $s_1$, and $S_2$. The type of signal of the second digital information is not yet known. This offers the possibility to add a signal of a not yet known type in the second track portions. In order to enable the decoder to decode the second digital information signal upon reproduction, the decoder has to know the type of signal of the second digital information signal. Thus, during recording of the second digital information signal in the edit mode, the apparatus is capable of generating second program information comprised packets $picp_2$. These packets $picp_2$ are also stored (recorded) in the second track portions $TP_2$ and indicate the type of information of the second digital information signal. Upon reproduction, the decoder knows from the packets picp2 what type of information the packets $P_2$ contained, so that the decoder is capable of decoding the packets $P_2$. The user may select one or both of the signals for reproduction.

In situation 11, the first track portions comprise first packets $P_1$ of the first digital information signal $s_1$ and the first program information comprised packets '$picp_1$'. The second track portions comprise the second packets $P_2$ comprising information of the second digital information signal $s_2$ and the second program information comprised packets '$picp_2$'. The program information contained in the first program information comprised packets '$picp_1$' indicates that the first digital information signal $s_1$ is an information signal of a certain type $t(s_1)$, such as a digital video signal, that a program A is present comprising the first digital information signal $s_1$ and that a program B is present comprising the second digital information signal $s_2$ of not yet known type. In order to enable the decoder to decode the second digital information signal upon reproduction, the decoder has to know the type of signal of the second digital information signal. Thus, during recording of the second digital information signal in the edit mode, the apparatus is capable of generating second program information comprised packets $picp_2$. These packets $picp_2$ are also stored (recorded) in the second track portions $TP_2$. Upon reproduction, the decoder knows from the picp packets $picp_1$ that two information signals may be present and from the packets $picp_2$ what type of signal the second information signal is. The user may select one of the programs, and thus one of the two signals, for reproduction.

In situation III, the first track portions comprise first packets $P_1$ of the first digital information signal $s_1$ and the first program information comprised packets '$picp_1$'. The second track portion comprises the second packets $P_2$ comprising information of the second digital information signal $s_2$ and second program information comprised packets $picp_2$. The program information contained in the program information comprised packets '$picp_1$' indicates that the first digital information signal $s_1$, is an information signal of a certain type $t(s_1)$, such as a digital video signal, that a second digital information signal $s_2$ of a not yet known type may be present, that a program A is present comprising the first digital information signal $s_1$, and that a program B is present comprising the first and the second digital information signal $s_2$. Otherwise said: in program B, the first and second digital information signal belong together. The signal $s_2$ is of a yet unknown type. In order to enable the decoder to decode the second digital information signal upon reproduction, the decoder has to know the type of signal of the second digital information signal $s_2$. Thus, during recording of the second digital information signal in the edit mode, the apparatus is capable of generating second program information comprised packets $picp_2$. These packets $picp_2$ are also stored (recorded) in the second track portions $TP_2$. Upon reproduction, the decoder knows from the picpl packets that two information signals may be present. The user may select one of the programs. Upon the selection of program A, the signal $s_1$, is reproduced only. Upon the selection of program B, both signals will be reproduced, where the packets $PiCP_2$ are used to identify the type of the second information signal.

In situation IV, the first track portions comprise first packets $P_1$ of the first digital information signal $s_1$, second packets $P_2$ of a second digital information signal $s_2$, such as a digital audio signal, and the first program information comprised packets '$picp_1$'. The second track portions comprise third packets $P_3$ comprising information of a third digital information signal $S_3$, such as an additional audio signal, and second program information comprised packets $picp_2$. The program information contained in the program information comprised packets '$picp_1$' indicates that the first digital information signal $s_1$ is an information signal of a certain type $t(s_1)$, such as a digital video signal, that the second digital information signal $s_2$ is an information signal of a certain type $t(s_2)$, such as a digital audio signal, that a third digital information signal $s_3$ of a not yet known type may be present, that a program A is present comprising the first, second and third digital information signals and that the three digital information signal belong together. The third digital information signal is of a yet unknown type. In order to enable the decoder to decode the third digital information signal upon reproduction, the decoder has to know the type of signal of the third digital information signal $s_3$. Thus, during recording of the third digital information signal in the edit mode, the apparatus is capable of generating second program information comprised packets $picp_2$. These packets $picp_2$ are also stored (recorded) in the second track portions $TP_2$ and indicate the type of information of the third digital information signal, which may be an audio signal or a data signal. Upon reproduction, the decoder knows from the $picp_1$ packets that three information signals may be present. The user may select one or more of the three signals. More specifically, the user may select the reproduction of the signals $s_1$, and $s_2$ at the same time, or the reproduction of the signals $s_1$ and $S_3$ at the same time. In the situation where the signal $s_3$ is selected for reproduction, the packets $picp_2$ are needed in the decoder.

In situation V, the first track portions comprise the first packets $P_1$ of the first digital information signal $s_1$, the second packets $P_2$ of a second digital information signal $S_2$, such as a digital audio signal, and the first program information comprised packets '$picp_1$'. The second track portions comprise the third packets $P_3$ comprising information of a third digital information signal $s_3$, such as an additional audio signal, and the second program information comprised packets $picp_2$. The program information contained in the program information comprised packets '$picp_1$' indicates that the first digital information signal $s_1$ is an information signal of a certain type $t(s_1)$, such as a digital video signal, that the second digital information signal $s_2$ is an information signal of a certain type $t(s_2)$, such as a digital audio signal, that a third digital information signal $s_3$ of a not yet known type may be present, that a program A is present comprising the first and the second digital information signals and that the two digital information signal belong together, and that a program B is present comprising the first and the third digital information signals and that the two digital information signals belong together. Upon reproduction, the decoder knows from the $picp_1$ packets that three information signals may be present, combined into two programs. The user may select one of the two programs for reproduction. The packets $picp_2$ stored in the second track portions are again used for identifying the type of the third digital information signal and for decoding the third digital information signal.

In situation VI, the first track portions comprise the first packets $P_1$ of the first digital information signal $s_1$, the second packets $P_2$ of a second digital information signal $S_2$, such as a digital audio signal, and the program information comprised packets '$picp_1$'. The second track portions comprise the third packets $P_3$ comprising information of a third digital information signal $s_3$, such as an additional audio signal, and the second program information comprised packets $picp_2$. The program information contained in the program information comprised packets '$picp_1$' indicates that the first digital information signal $s_1$, is an information signal of a certain type $t(s_1)$, such as a digital video signal, that the second digital information signal $s_2$ is an information signal of a certain type $t(s_2)$, such as a digital audio signal, that a third digital information signal $s_3$ of a yet unknown type may be present, that a program A is present comprising the first and the second digital information signals and that the two digital information signal belong together, and that a program B is present comprising the three digital information signals and that the three digital information signals belong together. The packets $picp_2$ again indicate the type of signal of the third digital information signal. Upon reproduction, the decoder knows from the $picp_1$ packets that three information signals may be present combined into two programs. The user may select one of the two programs for reproduction and uses the $picp_2$ packets for decoding and reproducing the third digital information signal.

The apparatuses for carrying out the recording and subsequent edit steps, in order to obtain one of the six situations, described above, with reference to FIG. 9, require some modifications of the apparatuses of the FIGS. 2, 4 and 6. More specifically, those modifications reside in the generation of the packets $picp_1$ and $picp_2$ (in the embodiment that receives an uncoded first digital information signal), or the conversion of the packets included in the received MPEG datastream into the packets $picp_1$ and $picp_2$.

In the situation where the apparatus receives, in the original recording step, an uncoded (not yet MPEG encoded) digital video signal and a corresponding digital audio signal (situation IV in FIG. 9), the apparatus generates the packets $picp_1$ during the MPEG encoding of the digital video signal and the digital audio signal, and stores the packets $P_1$, $P_2$ and $picp_1$ in the track portions $TP_1$. The packets $picp_1$ thus predict the presence of an additional information signal $S_3$, the type of which is not yet known. In a later edit step, an additional information signal may be recorded in the track portions $TP_2$. The apparatus is instructed by the user about the type of signal, encodes the information signal received into the packets $P_3$ and generates the packets picp$_2$. The serial datastream of packets P$_3$ and picp$_2$ are subsequently recorded in the second track portions TP$_2$.

In the situation where the apparatus receives, in the original recording step, an (MPEG) encoded digital video signal, the apparatus retrieves the program information comprised packets from the information stream received and converts the program information comprised packets into the packets picp$_1$ given in FIG. 9. Next, the serial datastream of packets P$_1$, P$_2$ and picp$_1$ are stored in the track portions TP$_1$. The packets picp$_1$ thus predict the presence of an additional information signal S$_3$, the type of which is not yet known. In a later edit step, an additional information signal can be recorded in the track portions TP$_2$. The apparatus is instructed by the user about the type of signal it receives in the edit step, encodes the information signal received into the packets P$_3$ and generates the packets picp$_2$. The serial datastream of packets P$_3$ and picp$_2$ are subsequently recorded in the second track portions TP$_2$.

It should be observed that the invention is not restricted only to the embodiments described, but is limited and defined only by the appended claims. Where necessary, the teachings described in earlier filed European application No. 95201688.9 corresponding to U.S. patent application Ser. No. 08/673,781, filed Jun. 20, 1996 (PHN 15.344) may be applied in the apparatuses described above, in order to enable the edit step. To that purpose, the contents of that earlier application is assumed to be incorporated herein by reference.

D1: European Patent EP-A 492,704, corresponding to U.S. Pat. No. 5,245,483 (PHN 13,546).

D2: IOS/IEC 13,818 International Standard, Part 1, "Systenw", dated Nov. 13, 1994.

D3: U.S. patent application Ser. No. 08/225,193, filed Apr. 8, 1994, now U.S. Pat. No. 5,579,183 (PHN 14,818)

D4: U.S. patent application Ser. No. 08/253,535, filed Jun. 3, 1994, now U.S. Pat. No. 5,596,581 (PHA 21,886).

D5: European Patent Application EP-A 95201688-.9, filed Jun. 22, 1995, corresponding to U.S. patent application Ser. No. 08/673,781, filed Jun. 20, 1996 (PHN 15,344).

What is claim is:

1. Apparatus for storing, in a first recording step, a first digital information signal in a first storage region of a storage medium, the apparatus comprising:

input means for receiving the first digital information signal;

first encoding means for encoding the first digital information signal to form a serial datastream of information packets, the serial datastream comprising first packets containing portions of information of the first digital information signal, the first encoding means further having means for generating packets comprising program information indicating that the first packets and other packets may belong together, said program information comprising packets also being included in the serial datastream;

second encoding means for channel encoding the serial datastream of information packets to form a first channel signal; and storing means for storing the first channel signal in the first storage region of the storage medium, the apparatus further being adapted to reproduce, in a first reproducing step, said first digital information signal from said first storage region, the apparatus further comprising:

retrieval means for retrieving the first channel signal from the first storage region; and channel decoding means for channel decoding the first channel signal to form a replica of the serial datastream of information packets;

characterized in that (a) during said recording step, the program information contained in said program information comprising packets generated by said generating means in the first encoding means indicates that the first packets and at least second packets belong together;

(b) the apparatus is further adapted to record, in a subsequent edit mode, a second digital information signal in a second storage region of the storage medium, the input means further having means for receiving the second digital information signal, the first encoding means further encoding said second digital information signal to form a second serial datastream comprising the second packets, the second packets containing portions of information of the second digital information signal, the second encoding means further channel encoding the second serial datastream to form a second channel signal, the storing means further storing the second channel signal into the second storage region of the storage medium; and (c) in said reproduction step, the apparatus is further adapted to reproduce said first digital information signal and/or said second digital information signal from said first storage region and said second storage region, respectively, using said retrieval means.

2. Apparatus as claimed in claim 1, characterized in that the storage medium is a storage medium of the hard disk type.

3. Apparatus as claimed in claim 1, characterized in that the storage medium is a longitudinal record carrier.

4. Apparatus as claimed in claim 1, characterized in that said apparatus further comprises:

first decoding means for decoding the first packets to form a replica of the first digital information signal using said program information comprising packets; and output means for supplying the replica of the first digital information signal.

5. Apparatus as claimed in claim 1, characterized in that the first digital information signal is a digital video signal.

6. Apparatus as claimed in claim 5, characterized in that the second digital information signal is a digital audio signal.

7. Apparatus as claimed in claim 3, wherein said longitudinal record carrier includes information tracks running in a slant direction across the record carrier, characterized in that the first storage region is first track portions contained in said tracks, and the second storage region is second track portions also contained in said tracks.

8. Apparatus as claimed in claim 7, for recording a third digital information signal in the first track portions of the tracks, characterized in that the input means further comprises means for receiving the third digital information signal; the first encoding means further encoding the third digital information signal, and including the encoded third digital information signal into the serial datastream of information packets, said serial datastream further comprising third packets containing portions of information of the third digital information signal, the program information comprising packets included in the serial datastream indicating that the first and the third packets may belong together, the apparatus further being adapted to reproduce, in said reproduction step, said first and said third digital information signal from said first track portions.

9. Apparatus as claimed in claim 8, characterized in that the third digital information signal is a digital audio signal.

10. Apparatus as claimed in claim 3, wherein said longitudinal record carrier includes information tracks running in the longitudinal direction on the record carrier, characterized in that the first storage region is a number of at least one first tracks, and the second storage region is a number of at least one second tracks on said record carrier.

11. Apparatus of the helical scan type, for recording, in a recording step, a digital video signal and a corresponding digital audio signal in first track portions on a record carrier, the apparatus comprising:

input means for receiving the digital video signal and the digital audio signal;

first encoding means for encoding the digital video signal and the digital audio signal to form a serial datastream of information packets, the serial datastream comprising first packets containing portions of information of the digital video signal, and second packets containing portions of information of the digital audio signal, the first encoding means further comprising means for generating packets comprising program information indicating that the first packets and the second packets belong together, said program information comprising packets also being included in the serial datastream;

second encoding means for channel encoding the serial datastream of information packets to form a first channel signal; and writing means, comprising at least one write head, for writing the first channel signal into the first track portions of the tracks, the apparatus further being adapted to reproduce, in a reproducing step, said digital video signal and said corresponding digital audio signal from said first track portions, the apparatus further comprising:

reading means, comprising at least one read head, for reading the first channel signal from the first track portions of the tracks;

channel decoding means for channel decoding the first channel signal to form a replica of the serial datastream of information packets;

first decoding means for decoding the first packets to form a replica of the digital video signal, and for decoding the second packets to form a replica of the digital audio signal, using said program information comprising packets; and output means for supplying the replicas of the digital video signal and the digital audio signal, characterized in that (a) during said recording step, the program information contained in said program information comprising packets generated by said generating means in the first encoding means indicates that the first packets and the second packets and at least third packets belong together;

(b) the apparatus is further adapted to record, in a subsequent edit mode, a second digital audio signal in second track portions of the tracks, the input means further comprising means for receiving the second digital audio signal, the first encoding means further encoding said second digital audio signal to form a second serial datastream of third packets, the third packets containing portions of information of the second digital audio signal, the second encoding means further channel encoding the second serial datastream to form a second channel signal, the writing means further writing the second channel signal into the second track portions of the tracks; and (c) in said reproduction step, the apparatus is further adapted to reproduce said digital video signal and said first digital audio signal from said first track portions, and to reproduce said digital video signal and said second digital audio signal from said first and second track portions, respectively, using said reading means.

12. Apparatus as claimed in claim 11, characterized in that in said initial recording step, the first encoding means generates interim third packets in an interim second serial datastream contain portions of information corresponding to a digital audio signal of zero amplitude, the second encoding means further channel encoding the first and interim second serial datastreams to form said first channel signal and an interim second channel signal, and the writing means further writing the first and interim second channel signals into the first and second track portions, respectively, of the tracks, and wherein during said edit mode, the apparatus replaces the interim second channel signal in the second track portion with said second channel signal.

13. Apparatus for storing, in a first recording step, a first digital information signal in a first storage region of a storage medium, the first digital information signal being included in a serial datastream of information packets, the serial datastream comprising first packets containing portions of information of the first digital information signal, and comprising program information comprising packets, the program information contained in said program information comprising packets indicating that the first packets and other packets may belong together, the apparatus comprising:

input means for receiving the serial datastream of information packets;

channel encoding means for channel encoding the serial datastream of information packets to form a first channel signal; and storing means for storing the first channel signal into the first storage region of the storage medium, the apparatus further being adapted to reproduce, in a reproducing step, said first digital information signal from said first storage region, the apparatus further comprising:

retrieval means for retrieving the first channel signal from the first storage region; and channel decoding means for channel decoding the first channel signal to form a replica of the serial datastream of information packets, characterized in that the apparatus further comprises conversion means for converting the program information comprising packets into converted packets, wherein (a) during said recording step, the conversion means converts the program information comprising packets to converted packets in which the program information contained in said converted packets indicates that the first packets and second packets belong together;

(b) the apparatus is further adapted to record, in a subsequent edit mode, a second digital information signal in a second storage region of the storage medium, the second digital information signal being included in a second serial datastream comprising second packets, the second packets containing portions of information of the second digital information signal, the channel encoding means being further adapted to channel encode the second serial datastream to form a second channel signal, the storing means further storing the second channel signal into the second storage region of the storage medium; and (c) in said reproduction step, the apparatus is further adapted to reproduce said first digital information signal and/or said second digital information signal from said first storage region and said second storage region, respectively, using said retrieval means.

14. Apparatus as claimed in claim 13, characterized in that the storage medium is a storage medium of the hard disk type.

15. Apparatus as claimed in claim 13, characterized in that the storage medium is a longitudinal record carrier.

16. Apparatus as claimed in claim 13, characterized in that said apparatus further comprises:
   first decoding means for decoding the first packets to form a replica of the first digital information signal using said program information comprising packets; and
   output means for supplying the replica of the first digital information signal.

17. Apparatus as claimed in claim 13, characterized in that the first digital information signal is a digital video signal.

18. Apparatus as claimed in claim 17, characterized in that the second digital information signal is a digital audio signal.

19. Apparatus as claimed in claim 15, wherein said longitudinal record carrier includes information tracks running in a slant direction across the record carrier, characterized in that the first storage region is first track portions contained in said tracks, and the second storage region is second track portions also contained in said tracks.

20. Apparatus as claimed in claim 19, for recording a third digital information signal in the first track portions of the tracks, characterized in that the input means further comprises means for receiving the third digital information signal; the second encoding means further encoding the third digital information signal, and including the encoded third digital information signal into the serial datastream of information packets, said serial datastream further comprising third packets containing portions of information of the third digital information signal, the program information comprising packets included in the serial datastream indicating that the first and the third packets may belong together, the apparatus further being adapted to reproduce, in said reproduction step, said first and said third digital information signal from said first track portions.

21. Apparatus as claimed in claim 20, characterized in that the third digital information signal is a digital audio signal.

22. Apparatus as claimed in claim 15, wherein said longitudinal record carrier includes information tracks running in the longitudinal direction on the record carrier, characterized in that the first storage region is a number of at least one first tracks, and the second storage region is a number of at least one second tracks on said record carrier.

23. Apparatus of the helical scan type for recording, in a recording step, a digital video signal and a corresponding digital audio signal in first track portions on a record carrier, the digital video signal and the digital audio signal being included in a serial datastream of information packets, the serial datastream comprising first packets containing portions of information of the digital video signal and second packets containing portions of information of the digital audio signal, and comprising program information comprising packets, the program information contained in said program information comprising packets indicating that the first packets and the second packets belong together, the apparatus comprising:
   input means for receiving the serial datastream of information packets;
   channel encoding means for channel encoding the serial datastream of information packets to form a first channel signal; and
   writing means, comprising at least one write head, for writing the first channel signal into the first track portions of the tracks, the apparatus further being adapted to reproduce, in a reproducing step, said digital video signal and said corresponding digital audio signal from said first track portions, the apparatus further comprising:
   reading means, comprising at least one read head, for reading the first channel signal from the first track portions of the tracks;
   channel decoding means for channel decoding the first channel signal to form a replica of the serial datastream of information packets;
   first decoding means for decoding the first packets to form a replica of the digital video signal, and for decoding the second packets to form a replica of the digital audio signal, using said program information comprising packets; and
   output means for supplying the replicas of the digital video signal and the digital audio signal, characterized in that the apparatus further comprises conversion means for converting the program information comprising packets into converted packets, wherein (a) during said recording step, the conversion means converts the program information comprising packets to converted packets in which the program information contained in the converted packets indicates that the first packets and the second packets and at least third packets belong together;

(b) the apparatus is further adapted to record, in a subsequent edit mode, a second digital audio signal in second track portions of the tracks, the input means further comprising means for receiving the second digital audio signal, the second digital audio signal being included in a second serial datastream of third packets, the third packets containing portions of information of the second digital audio signal; the channel encoding means further channel encoding the second serial datastream to form a second channel signal, the writing means further writing the second channel signal into the second track portions of the tracks; and (c) in said reproduction step, the apparatus is further adapted to reproduce said digital video signal and said first digital audio signal from said first track portions, and to reproduce said digital video signal and said second digital audio signal from said first and second track portions, respectively, using said reading means.

24. Apparatus as claimed in claim 23, characterized in that for said recording step, said apparatus further comprises means for generating interim third packets in an interim second serial datastream contain portions of information corresponding to a digital audio signal of zero amplitude, the channel encoding means further channel encoding the first and interim second serial datastreams to form said first channel signal and an interim second channel signal, and the writing means further writing the first and interim second channel signals into the first and second track portions, respectively, of the tracks, and wherein during said edit mode, the apparatus replaces the interim second channel signal in the second track portion with said second channel signal.

25. Apparatus for storing, in a first recording step, a first digital information signal in a first storage region of a storage medium, the apparatus comprising:
   input means for receiving the first digital information signal;
   first encoding means for encoding the first digital information signal to form a serial datastream of information packets, the serial datastream comprising first packets containing portions of information of the first digital information signal, the first encoding means further comprising means for generating first program information comprising packets, said first program information comprising packets also being included in the serial datastream;

second encoding means for channel encoding the serial datastream of information packets to form a first channel signal; and storing means for storing the first channel signal into the first storage region of the storage medium, the apparatus further being adapted to reproduce, in a first reproducing step, said first digital information signal from said first storage region, the apparatus further comprising:

retrieval means for retrieving the first channel signal from the first storage region; and channel decoding means for channel decoding the first channel signal to form a replica of the serial datastream of information packets, characterized in that (a) during said recording step, the program information contained in said program information comprising packets generated by said generating means in the first encoding means indicates that there may be second packets containing portions of information of a second digital information signal;

(b) the apparatus is further adapted to record, in a subsequent edit mode, a second digital information signal in a second storage region of the storage medium, the input means further comprising means for receiving the second digital information signal, the first encoding means further encoding said second digital information signal to form a second serial datastream comprising second packets and second program information comprising packets, the second packets containing portions of information of the second digital information signal, and the second program information comprising packets containing information indicating the type of the second digital information signal, the second encoding means further channel encoding the second serial datastream to form a second channel signal, the storing means further storing the second channel signal into the second storage region of the storage medium; and (c) in said reproduction step, the apparatus is further adapted to reproduce said first digital information signal and/or said second digital information signal from said first storage region and said second storage region, respectively, using said retrieval means.

26. Apparatus as claimed in claim 25, characterized in that the storage medium is a storage medium of the hard disk type.

27. Apparatus as claimed in claim 25, characterized in that the storage medium is a longitudinal record carrier.

28. Apparatus as claimed in claim 25, characterized in that the apparatus further comprises:

first decoding means for decoding the first packets to form a replica of the first digital information signal using said program information comprising packets; and output means for supplying the replica of the first digital information signal.

29. Apparatus as claimed in claim 25, characterized in that the first digital information signal is a digital video signal.

30. Apparatus as claimed in claim 29, characterized in that the second digital information signal is a digital audio signal.

31. Apparatus as claimed in claim 27, wherein said longitudinal record carrier includes information tracks running in a slant direction across the record carrier, characterized in that the first storage region is first track portions contained in said tracks, and the second storage region is second track portions also contained in said tracks.

32. Apparatus as claimed in claim 31, for recording a third digital information signal in the first track portions of the tracks, characterized in that the input means further comprises means for receiving the third digital information signal, the first encoding means further encoding the third digital information signal, and including the encoded third digital information signal into the serial datastream of information packets, said serial datastream further comprising third packets containing portions of information of the third digital information signal, the program information comprising packets included in the serial datastream indicating that the first and the third packets may belong together, the apparatus further being adapted to reproduce, in said reproduction step, said first and said third digital information signal from said first track portions.

33. Apparatus as claimed in claim 32, characterized in that the third digital information signal is a digital audio signal.

34. Apparatus as claimed in claim 27, wherein said longitudinal record carrier includes information tracks running in the longitudinal direction on the record carrier, characterized in that the first storage region is a number of at least one first tracks, and the second storage region is a number of at least one second tracks on said record carrier.

35. Apparatus of the helical scan type for recording, in a recording step, a digital video signal and a corresponding digital audio signal in first track portions on a record carrier, the apparatus comprising:

input means for receiving the digital video signal and the digital audio signal;

first encoding means for encoding the digital video signal and the digital audio signal to form a serial datastream of information packets, the serial datastream comprising first packets containing portions of information of the digital video signal and second packets containing portions of information of the digital audio signal, the first encoding means further comprising means for generating first program information comprising packets, said first program information comprising packets also being included in the serial datastream;

second encoding means for channel encoding the serial datastream of the packets to form a first channel signal; and writing means, comprising at least one write head, for writing the first channel signal into the first track portions of the tracks, the apparatus further being adapted to reproduce, in a reproducing step, said digital video signal and said corresponding digital audio signal from said first track portions, the apparatus further comprising:

reading means, comprising at least one read head, for reading the first channel signal from the first track portions of the tracks;

channel decoding means for channel decoding the first channel signal to form a replica of the serial datastream of information packets;

first decoding means for decoding the first packets to form a replica of the digital video signal, and for decoding the second packets to form a replica of the digital audio signal, using said program information comprising packets; and output means for supplying the replicas of the digital video signal and the digital audio signal, characterized in that
  (a) during said recording step, the program information contained in said program information comprising packets generated by said generating means in the first encoding means indicates that the first packets and the second packets belong together and that there may be third packets comprising portions of information of a third digital information signal;
  (b) the apparatus is further adapted to record, in a subsequent edit mode, a third digital information signal in second track portions of the tracks, the input means further comprising means for receiving the third digital information signal, the first encoding means further encoding said third digital information signal to form a second serial datastream of third packets and second program information comprising packets, the third packets containing portions of information of the third digital information signal, and the second program information comprising packets containing information indicating the type of the third digital information signal, the second encoding means further channel encoding the second serial datastream to form a second channel signal, the writing means further writing the second channel signal into the second track portions of the tracks; and
  (c) in said reproduction step, the apparatus is further adapted to reproduce said digital video signal and said first digital audio signal from said first track portions, and to reproduce said third digital information signal from said second track portions, respectively, using said reading means.

36. Apparatus as claimed in claim 35, characterized in that in said initial recording step, the first encoding means generates interim third packets in an interim second serial datastream containing portions of information corresponding to a digital audio signal of zero amplitude, the second encoding means further channel encoding the first and interim second serial datastreams to form said first channel signal and an interim second channel signal, and the writing means further writing the first and interim second channel signals into the first and second track portions, respectively, of the tracks, and wherein during said edit mode, the apparatus replaces the interim second channel signal in the second track portion with said second channel signal.

37. Apparatus for storing, in a first recording step, a first digital information signal in a first storage region of a storage medium, the first digital information signal being included in a serial datastream of information packets, the serial datastream comprising first packets containing portions of information of the first digital information signal, and comprising program information comprising packets, the program information contained in said program information comprising packets indicating that the serial datastream comprises first packets of the first digital information signal, the apparatus comprising:
  input means for receiving the serial datastream of packets;
  channel encoding means for channel encoding the serial datastream of packets to form a first channel signal; and
  storing means for storing the first channel signal into the first storage region of the storage medium;
the apparatus further being adapted to reproduce, in a reproducing step, said first digital information signal from said first storage region, the apparatus further comprising:
  retrieval means for retrieving the first channel signal from the first storage region; and
  channel decoding means for channel decoding the first channel signal to form a replica of the serial datastream of packets;

characterized in that the apparatus is provided with conversion means for converting the program information comprising packets into converted packets; wherein
  (a) during said recording step, the conversion means converts the program information comprising packets to converted packets in which the program information contained in said converted packets indicates that there may be second packets comprising portions of information of a second digital information signal;
  (b) the apparatus is further adapted to record, in a subsequent edit mode, a second digital information signal in a second storage region of the storage medium, the input means further comprising means for receiving the second digital information signal, the second digital information signal being included in a second serial datastream comprising second packets and second program information comprising packets, the second packets containing portions of information of the second digital information signal, and the second program information comprising packets containing information indicating the type of the second digital information signal, the channel encoding means further channel encoding the second serial datastream to form a second channel signal, the storing means further storing the second channel signal into the second storage region of the storage medium; and
  (c) in said reproduction step, the apparatus is further adapted to reproduce said first digital information signal and/or said second digital information signal from said first storage region and said second storage region, respectively, using said reading means.

38. Apparatus as claimed in claim 37, characterized in that the storage medium is a storage medium of the hard disk type.

39. Apparatus as claimed in claim 37, characterized in that the storage medium is a longitudinal record carrier.

40. Apparatus as claimed in claim 37, characterized in that said apparatus further comprises:
  first decoding means for decoding the first packets to form a replica of the first digital information signal using said program information comprising packets; and
  output means for supplying the replica of the first digital information signal.

41. Apparatus as claimed in claim 37, characterized in that the first digital information signal is a digital video signal.

42. Apparatus as claimed in claim 41, characterized in that the second digital information signal is a digital audio signal.

43. Apparatus as claimed in claim 39, wherein said longitudinal record carrier includes information tracks running in a slant direction across the record carrier, characterized in that the first storage region is first track portions contained in said tracks, and the second storage region is second track portions also contained in said tracks.

44. Apparatus as claimed in claim 43, for recording a third digital information signal in the first track portions of the tracks, characterized in that the input means further comprises means for receiving the third digital information signal, the apparatus further comprising encoding means for encoding the third digital information signal, and for including the encoded third digital information signal into the serial datastream of information packets, said serial datastream further comprising third packets containing portions of information of the third digital information signal, the program information comprising packets included in the serial datastream indicating that the first and the third packets may belong together, the apparatus further being adapted to reproduce, in said reproduction step, said first and said third digital information signal from said first track portions.

45. Apparatus as claimed in claim 44, characterized in that the third digital information signal is a digital audio signal.

46. Apparatus as claimed in claim 39, wherein the longitudinal record carrier includes information tracks running in the longitudinal direction on the record carrier, characterized in that the first storage region is a number of at least one first tracks, and the second storage region is a number of at least one second tracks on said record carrier.

47. Apparatus of the helical scan type for recording, in a recording step, a digital video signal and a corresponding digital audio signal in first track portions on a record carrier, the digital video signal and the digital audio signal being included in a serial datastream of information packets, the serial datastream comprising first packets containing portions of information of the digital video signal, and second packets containing portions of information of the digital audio signal, and comprising program information comprising packets, the program information contained in said program information comprising packets indicating that the first packets and the second packets belong together, the apparatus comprising:

input means for receiving the serial datastream of information packets;

channel encoding means for channel encoding the serial datastream of information packets to form a first channel signal; and writing means, comprising at least one write head, for writing the first channel signal into the first track portions of the tracks, the apparatus further being adapted to reproduce, in a reproducing step, said digital video signal and said corresponding digital audio signal from said first track portions, the apparatus further comprising:

reading means, comprising at least one read head, for reading the first channel signal from the first track portions of the tracks;

channel decoding means for channel decoding the first channel signal to form a replica of the serial datastream of information packets;

first decoding means for decoding the first packets to form a replica of the digital video signal, and for decoding the second packets to form a replica of the digital audio signal, using said program information comprising packets; and output means for supplying the replicas of the digital video signal and the digital audio signal, characterized in that the apparatus is provided with conversion means for converting the program information comprising packets into converted packets; wherein (a) during said recording step, the conversion means converts the program information comprising packets to converted packets in which the program information contained in said converted packets indicates that the first packets and the second packets belong together, and that there may be third packets containing portions of information of a third digital information signal;

(b) the apparatus is further adapted to record, in a subsequent edit mode, a third digital information signal in second track portions of the tracks, the input means further comprising means for receiving the third digital information signal, said third digital information signal being included in a second serial datastream of third packets and second program information comprising packets, the third packets containing portions of information of the third digital information signal, and the second program information comprising packets containing information indicating the type of the third digital information signal, the channel encoding means further channel encoding the second serial datastream to form a second channel signal, the writing means further writing the second channel signal into the second track portions of the tracks; and (c) in said reproduction step, the apparatus is further adapted to reproduce said digital video signal and said first digital audio signal from said first track portions, and to reproduce said third digital information signal from said second track portions, using said reading means.

48. Apparatus as claimed in claim 47, characterized in that for said initial recording step, said apparatus further comprises means for generating interim third packets in an interim second serial datastream containing portions of information corresponding to a digital audio signal of zero amplitude, the channel encoding means further channel encoding the first and interim second serial datastreams to form said first channel signal and the interim second channel signal, and the writing means further writing the first and interim second channel signals into the first and second track portions, respectively, of the tracks, and wherein during said edit mode, the apparatus replaces the interim second channel signal in the second track portion with said second channel signal.

49. Method of carrying out a storing/recording and a subsequent edit step in an apparatus for storing, in a first recording step, a first digital information signal in a first storage region of a storage medium, the method comprising the steps:

receiving the first digital information signal;

first encoding the first digital information signal to form a serial datastream of information packets, the serial datastream comprising first packets containing portions of information of the first digital information signal, the first encoding step further comprising generating packets comprising program information indicating that the first packets and other packets may belong together, said program information comprising packets also being included in the serial datastream;

second encoding the serial datastream of information packets to form a first channel signal; and storing the first channel signal in the first storage region of the storage medium, the method further comprising reproducing, in a first reproducing step, said first digital information signal from said first storage region, the method further comprising the steps:

retrieving the first channel signal from the first storage region; and channel decoding the first channel signal to form a replica of the serial datastream of information packets;

characterized in that (a) during said recording step, the program information contained in said program information comprising packets generated in said generating step in the first encoding step indicates that the first packets and at least second packets belong together;

(b) the method further comprising recording, in a subsequent edit mode, a second digital information signal in a second storage region of the storage medium, the receiving step further comprising receiving the second digital information signal, the first encoding step further comprising encoding said second digital information signal to form a second serial datastream comprising the second packets, the second packets containing portions of information of the second digital information signal, the second encoding step comprising further channel encoding the second serial datastream to form a second channel signal, the storing step further comprising storing the second channel signal into the second storage region of the storage medium; and (c) in said reproduction step, the method further comprising reproducing said first digital information signal and/or said second digital information signal from said first storage region and said second storage region, respectively.

50. Record carrier having tracks of information recorded on it, the record carrier having first tracks (or first track portions) and second tracks (or second track portions), a first digital information signal being recorded in the first tracks (or first track portions) on the record carrier in the form of channel encoded first packets of information, the first tracks (or first track portions) further comprising channel encoded program information comprising packets, the program information contained in said program information comprising packets indicating that the first packets and at least second packets belong together, and indicating the type of information to be included in said second packets, said second packets being channel encoded second packets forming a second digital information signal to be recorded in the second tracks (or second track portions) in a later editing operation.

51. Record carrier having tracks of information recorded on it, the record carrier having first tracks (or first track portions) and second tracks (or second track portions), a first digital information signal being recorded in the first tracks (or first track portions) on the record carrier in the form of channel encoded first packets of information, the first tracks (or first track portions) further comprising channel encoded program information comprising packets, the program information contained in said program information comprising packets indicating that first packets are present and that there may be second packets containing portions of information of a second digital information signal to be recorded in the second tracks (or second track portions) in a later editing operation.

* * * * *